United States Patent [19]

Rosaen

[11] Patent Number: 4,721,563
[45] Date of Patent: Jan. 26, 1988

[54] FLUID FILTERING DEVICE

[76] Inventor: Borje O. Rosaen, P.O. Box 1085, 5741 Jackson Rd., Ann Arbor, Mich. 48106

[21] Appl. No.: 905,655

[22] Filed: Sep. 11, 1986

[51] Int. Cl.$^4$ .............................................. B01D 35/14
[52] U.S. Cl. ..................... 210/85; 210/450; 210/451; 210/477; 210/DIG. 14
[58] Field of Search ............. 210/232, 234, 450, 451, 210/473, 474, 477, 445, 448, 452, 133, 453, 447, 593, 90, 91, 87, DIG. 14

[56] References Cited

U.S. PATENT DOCUMENTS

| | | | |
|---|---|---|---|
| 3,794,168 | 2/1974 | Perkins | 210/90 |
| 4,053,410 | 10/1977 | Lorimor | 210/133 |
| 4,179,372 | 12/1979 | Rosaen | 210/90 |
| 4,495,068 | 1/1985 | Rosaen | 210/91 |

FOREIGN PATENT DOCUMENTS 952237  11/1949  France ................. 210/133

Primary Examiner—Frank Sever
Attorney, Agent, or Firm—Gifford, Groh, VanOphem, Sheridan, Sprinkle and Dolgorukov

[57]  ABSTRACT

A fluid filtering device employs a removably insertable filter element which must be positioned within the device in order to avoid an indicator signal thereby alerting the user to inadvertant use of the filtering device without the filter element. The device generally includes a filter housing and rotatably securable filter head having inlet, outlet and bypass fluid passageways. The filtering structure includes a tubular filter element attached to a concave plate having the seal secured to the outer rim thereof. The concave plate includes a central opening which allows fluid communication between one fluid passageway and the inner chamber of the filter element and a plurality of peripherally disposed openings which permit fluid communication between the other fluid passageway and the outer housing chamber. Bypass means, responsive to an increased pressure differential across the filter element such as occurs with clogging, are provided for direct fluid communication between the inlet and outlet passageways or direct fluid communication between the inlet and bypass passageways.

21 Claims, 9 Drawing Figures

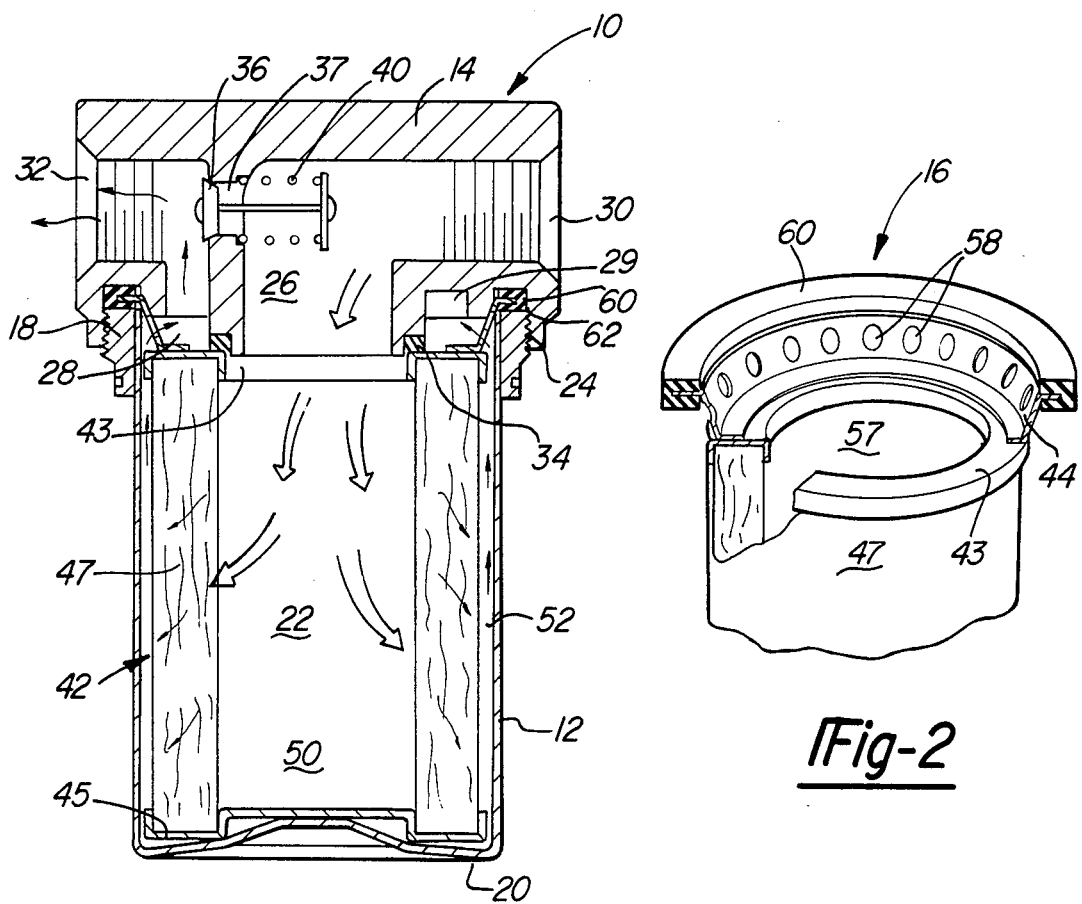
Fig-1
Fig-2
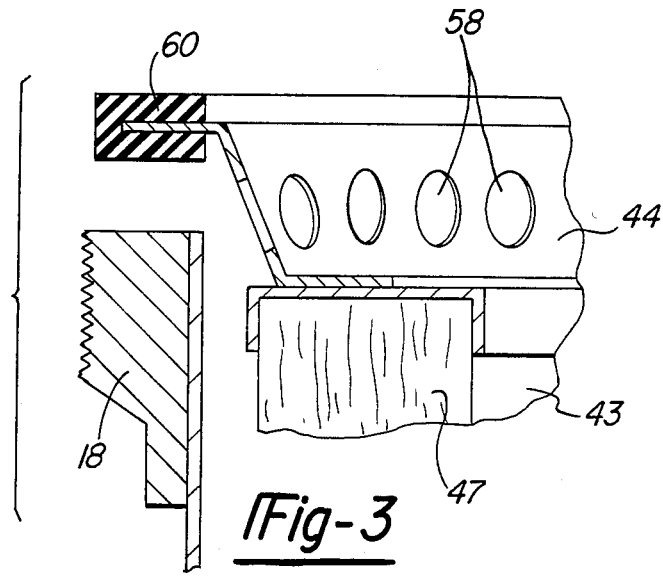
Fig-3

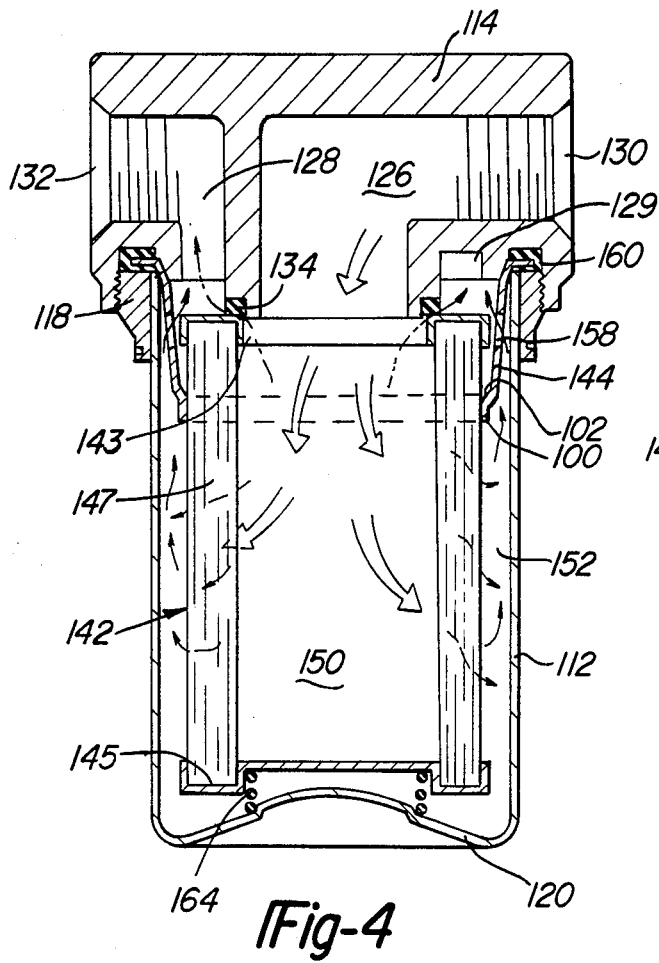
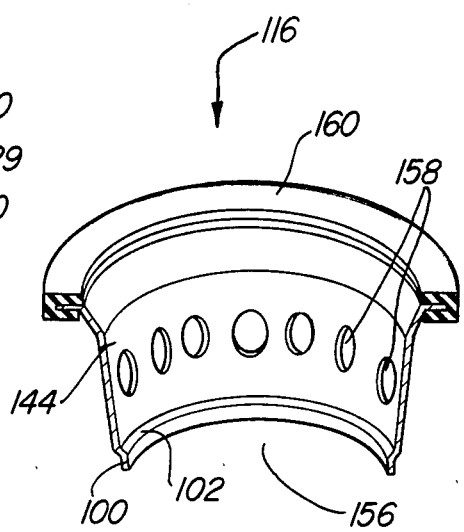
Fig-4
Fig-5

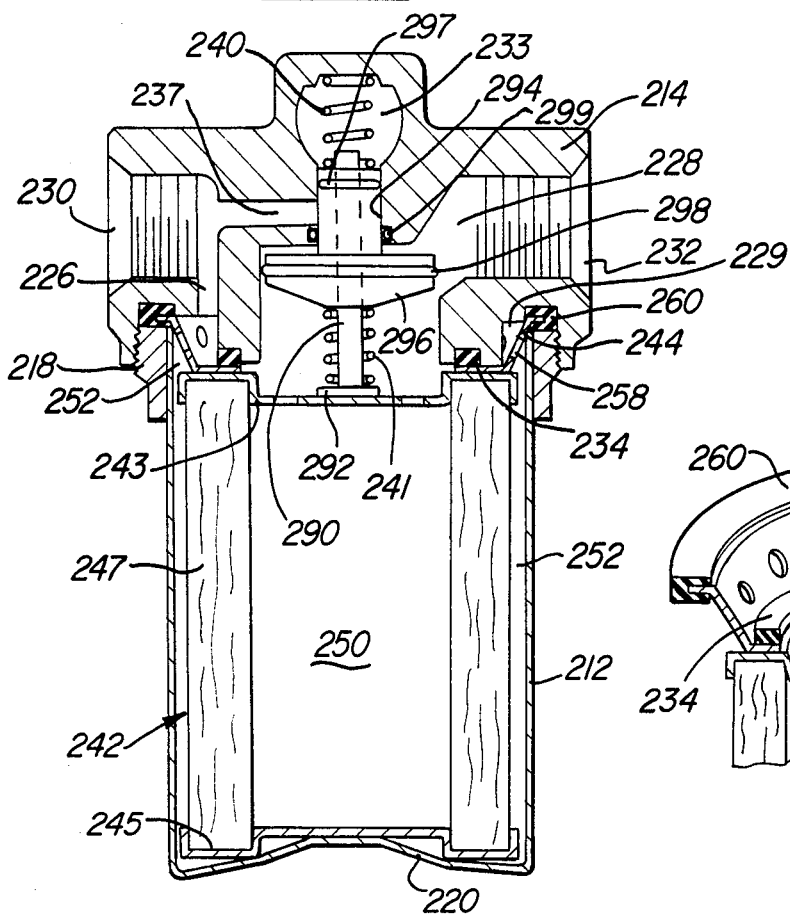
Fig-6
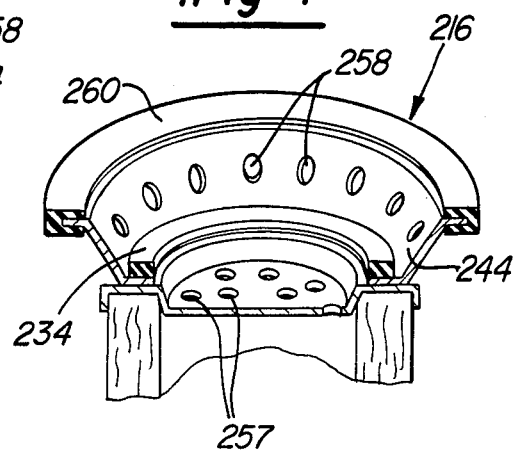
Fig-7
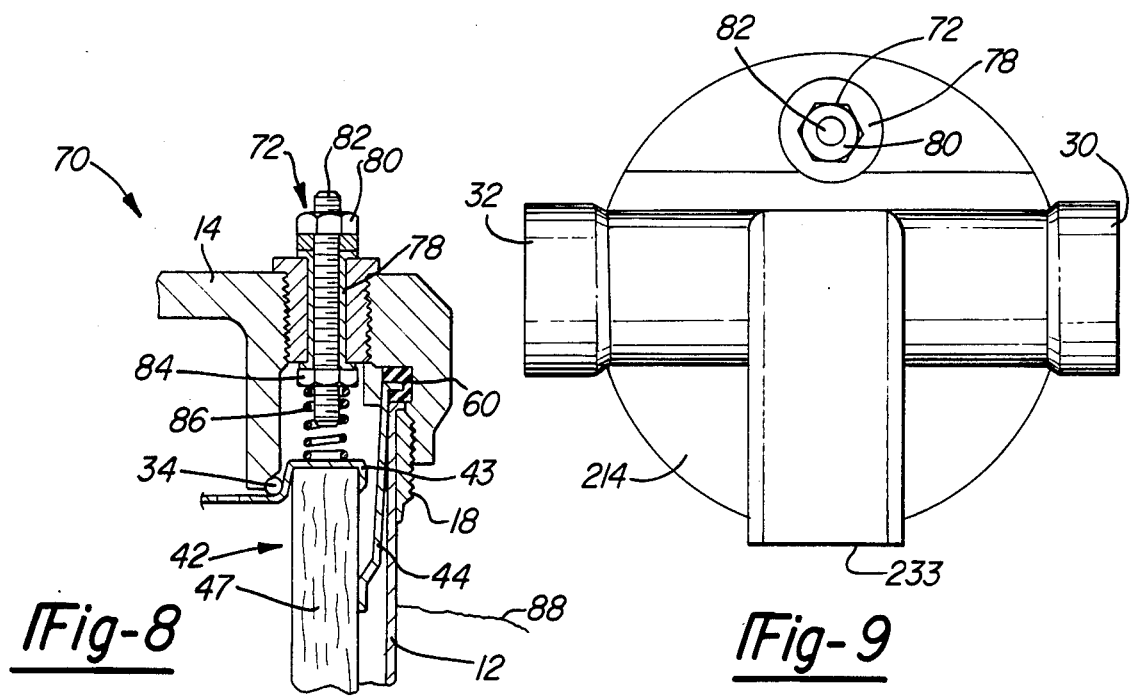
Fig-8
Fig-9

FLUID FILTERING DEVICE

BACKGROUND OF THE INVENTION

I. Field of the Invention

This invention relates to fluid filtering devices and, in particular, to a filtering device with a removable filter element and a rotatably securable filter head.

II. Description of the Prior Art

Fluid filtering devices which employ a rotatably securable filter head are well known in the prior art. Generally, these filtering devices include a filter head, having an inlet port and an outlet port, and which may be secured to a cylindrical fluid housing which is closed at one end and open at its other. A seal is usually provided between the fluid head and the housing to fluidly seal these two components once the filter head is rotatably secured to the housing.

The filter element is placed within the filter housing functionally between the fluid inlet and the fluid outlet such that fluid flows through the filtering media of the element. The filter element is typically cylindrical and closed at the bottom to force fluid flow through the element. The device may also be provided with one or more bypass valves which directly connect the inlet and outlet ports when pressure across the filter element becomes excessive due to a clogged or dirty filter element.

One disadvantage of such previously known filtering devices is that it is oftentimes difficult to determine when the filter element has been removed from the housing. With the filter head secured to the housing, the user is unable without disassembling the device to determine whether the filter element has been properly replaced. In addition, an unknowing user may assume that the filter element is properly positioned upon seeing the assembled device thereby possibly causing damage upon operation of the filtering system.

In an attempt to eliminate the possibility of operating the device without a filter element, filtering devices have been developed which employ a filter element integrally formed with a housing. With this construction, the device cannot be operated without a filter element in place and the absence of a filter element is apparent. However, with this construction, both the filter element and the housing must be discarded when the element becomes clogged thereby increasing replacement costs. In addition, in order to increase the pressure rating of the filtering device by substituting a fluid housing constructed of stronger materials, the filtering element must also be replaced and if such devices are used for high pressure applications the cost of replacing filter elements becomes expensive because the cost includes the cost of the housing which must be increased in strength to withstand the high pressures and which is discarded each time the filter element gets dirty.

SUMMARY OF THE PRESENT INVENTION

The present invention provides a fluid filtering device which overcomes all of the above mentioned disadvantages of the previously known devices.

The fluid filter device according to the present invention generally comprises a tubular and cylindrical housing which is closed at one end and open at its other end thus defining the interior chamber of the device. A filter head having a fluid inlet port and fluid outlet port is rotatably secured to the open end of the housing such that the fluid ports are open to the housing chamber. An alternate embodiment also has a bypass port connectable to the inlet port.

A filter element is removably insertable into the housing chamber through the open top of the housing. The filter element is generally cylindrical and has its bottom end closed thereby defining two chambers within the housing: an inner chamber which is defined by interior of the cylindrical filter element and is fluidly connected to one port, and an outer chamber which is defined by the outside of the filter element and the housing wall and is fluidly connected to the other port.

Secured to the top of the filter element is a concave plate provided with a centrally disposed annular opening. The central opening allows fluid communication between one of the fluid ports of the filter head and the interior of the filter element. Similarly, a series of peripherally disposed openings formed in the concave plate provide fluid communication from the outer chamber of the element to the other fluid port. Mounted to the peripheral edge of the plate is a seal which provides sealing engagement between the filter head and the housing. Since the seal is mounted to the filter element and because the seal prevents fluid leakage between the filter head and the housing if the filter element is not in place, fluid leakage will occur between the housing and the filter head. Additionally, an electrical switch may be disposed in the filter head so that the presence of a filter element in the housing closes the switch and completes an electrical circuit which activates an indicator, such as a lamp. The user who attempts to operate the system without a filter element in place will immediately be made aware of the absence of the seal and thus the absence of a filter element.

In order to prevent damage to the filtering system or to the filter element when it becomes clogged, means are provided to bypass the filter element when the pressure differential across the element becomes excessive. The bypass feature of the present invention may route fluid through to the outlet port or, alternatively, it may route fluid through the bypass port to a separate tank. The bypass-to-outlet feature may be included in the filter head or incorporated into the filter element and the concave plate.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of the preferred embodiment of the present invention when read in conjunction with the accompanying drawing, in which like reference characters refer to like parts throughout the views, and in which:

FIG. 1 is a cross-sectional view of one preferred embodiment of the present invention;

FIG. 2 is a fragmentary elevated perspective view of the filtering component of FIG. 1 utilizing the annular top filter cap;

FIG. 3 is an enlarged cross-sectional perspective view of a protion of the present invention shown in FIG. 1;

FIG. 4 is a cross-sectional view similar to FIG. 1 but showing another preferred embodiment of the present invention;

FIG. 5 is an elevated perspective view of the filter component of the preferred embodiment of the present invention shown in FIG. 4 and with portions removed for clarity;

FIG. 6 is a cross-sectional view similar to FIG. 1 but showing another preferred embodiment of the present invention;

FIG. 7 is a fragmentary elevated perspective view of the filter component of FIG. 6 utilizing a perforated disk type top filter cap;

FIG. 8 is a partial cross-sectional view of a preferred embodiment of the electrical indicating means of the present invention; and FIG. 9 is a top plan view of a preferred embodiment illustrating the locations of the electrical indicating means of FIG. 8 and the bypass port relative to the inlet and outlet ports.

DETAILED DESCRIPTION OF SEVERAL PREFERRED EMBODIMENTS OF THE PRESENT INVENTION

Referring first to FIGS. 1 through 3, a fluid filter device 10 is thereshown embodying the present invention and as comprising generally a fluid housing 12, a filter head 14, and a filter component generally designated 16. In the preferred embodiment, the filter component 16 is removably insertable into the fluid housing 12. Once the filter component 16 is in position, the filter head 14 may be secured to the housing 12, and the device 10 placed within the fluid system. However, as will be described in greater detail, use of the device 10 without the filter component 16 is prevented because of the interrelationship of the three components.

Referring now to FIGS. 1 and 3, the fluid housing 12 is preferably a tubular housing having an open top 18 and a closed bottom 20. The fluid housing 12 defines an interior fluid chamber 22 which accepts and retains the filter component 16. In addition, the top 18 of the housing 12 is provided with an outwardly threaded portion 24 which allows the filter head 14 to be rotatably secured to the housing 12. However, it is to be understood that the filter head 14 may be secured to the housing 12 other than in the manner shown.

As is best seen in FIG. 1, the filter head 14 includes fluid passageways 26 and 28 which connect the inlet port 30 and outlet port 32 respectively of the device 10 to the interior housing 12. In one embodiment, passageway 26 connects the inlet port 30 to the interior chamber 22 while passageway 28 connects the outlet port 32 to the interior chamber 22 at a different location. However, it should be understood that flow may be in either direction as will be described in greater detail herein. Moreover, fluid passageay 28 connects with an annular passage 29 which extends about the circumference of the filter head 14 in order to permit flow along the walls of the housing 12. Conversely, the passageway 26 terminates in the center of the filter head 14 to permit flow to and from the interior chamber 22. A fluid seal 34 is provided to sealingly isolate the fluid passageways 26 and 28 from one another when the device 10 is assembled and properly functioning.

Referring generally to FIG. 1 and as is best shown in FIGS. 2 and 3, the filter component 16 is removably insertable into housing 12 and rests on the open top 18 of the housing 12. The filter component 16 comprises a filter element 42 and a substantially concave plate 44. The filter element 42 further comprises a filtering material 47 enclosed between filter caps 43 and 45, and extends substantially the entire length of the housing 12.

The cap 45 closes off the bottom of the filter element 42 thereby defining an inner fluid chamber 50 within the filter component 16 and an outer fluid chamber 52 between the filter component 16 and the walls of the housing 12. The cap 43 may be annular with a single large opening 57 as shown in FIG. 2 or it may be disk shaped with numerous smaller openings 257 as shown in FIG. 7.

In the embodiment shown in FIGS. 1 through 3, the concave plate 44 is permanently secured to the annular cap 43 thereby joining the plate 44 and the filter element 42, however, other means may be used to attach the concave plate 44 to the filter element 42, as shown in FIGS. 4–6. The plate 44 includes a centrally disposed opening 56 and a plurality of peripherally disposed openings 58. The central plate opening 56, by way of a large opening 57 in cap 43, provides fluid communication between the inner fluid chamber 50 and the fluid passageway 26. Similarly, the peripherally disposed openings 58 provide fluid communication between the outer fluid chamber 52 and the annular passage 29. In addition, because the seal 34 abuts against the filter element 42, fluid flow between the passageway 26 and inner chamber 50, and the passageway 28 and outer chamber 52, is only possible through the filtering material 47 of the filter element 42.

Secured to the outer rim of the plate 44 is an annular seal 60 which extends about the entire circumference of the plate 44. The seal 60 preferably has a substantially rectangular cross-section which conforms to an annular recess 62 formed in the filter head 14 at the point where the filter head 14 joins the housing 12. The seal 60 is necessary to provide sufficient sealing engagement between the two components. Without the seal 60, the device 10 would operate inefficiently because of significant fluid leakage between the filter head 14 and the housing 12. Moreover, the seal 60 is preferably integrally formed with the outer rim of the plate 44. In this way, removal of the filter element 42 necessarily also removes the attached concave plate 44 and seal 60. A user of the device 10 without seal 60 is immediately alerted by the considerable fluid leakage between the housing 12 and the filter head 14 that no filter element 42 is present in the housing 12. Thus, the presence or absence of a filter element 42 is quickly and easily indicated to the user.

Referring now to FIG. 8 an alternate or additional indicating means 70 is thereshown. The indicating means 70 generally comprises an electrical switch 72 and an indicator 74, electrically connected in series with a source of voltage (not shown). In the preferred embodiment the source of voltage 76 is a battery and the indicator 74 is a lamp, although it could also be an audible indicating means, such as a bell or buzzer.

The electrical switch 72 is disposed in the filter head 14, but is insulated therefrom by an insulating sleeve 78. In the preferred embodiment shown in FIG. 8, the source of voltage 76 is connected by a nut 80 to a bolt 82 which passes through insulating sleeve 78 in filter head 14. On the inside of filter head 14, a second nut 84 holds the bolt 82 in place and also retains one end of contact spring 86. Contact spring 86 extends into the housing 12 and makes contact with the metal cap 43 of filter element 42 if the filter element 42 is present in housing 12. The metal cap 43 is in electrical contact with concave plate 44 which, in turn, contacts the housing 12. An electrical conductor 88 connects the housing 12 to a lamp and then to the voltage source. Thus, if the filter element 42 is secured in housing 12, the electrical circuit is completed and the indicator lamp 74 will light. Conversely, if no filter element 42 is present, the circuit remains open and the indicator lamp 74 will not light, thus alerting the user.

To avoid interference with the inlet and outlet ports 30, 32 respectively, the electrical switch 72 may be located around the perimeter as shown in FIG. 9. In addition, although in the present embodiment the circuit is closed when the filter element 42 is present, it is understood that the switch 72 could also be designed to be open when the filter element 42 is present, thus lighting the indicator lamp 74 as a warning only when the device 10 is without its filter element 42.

A different but related problem occurs when there is a filter element 42 present in the system but it becomes clogged and restricts fluid flow. When this happens, pressure in the inner chamber 50 and passage 26 increases, while pressure in the outer chamber 52 and passage 28 decreases. A significant pressure differential can cause damage to the system or to the filter element 42, thus it is desirable to install a bypass means to alleviate the pressure differential. Such bypass means may route fluid directly from the inlet port 30 to the outlet port 32, or may route fluid to a tank or secondary filtering means.

Referring again to FIG. 1, a means for bypassing the filter component 16 and routing fluid directly to the outlet port 32 is thereshown. The bypass means includes a bypass valve 36 mounted in an intermediate passage 37 which extends between the fluid passageways 26 and 28 in the filter head 14. The bypass valve 36 is of the spring biased type and is normally biased closed by spring 40. If pressure in passageway 26 exceeds the tension of spring 40, chosen to be some predetermined valve, the bypass valve 36 opens and fluid flows directly into passageway 28 and outlet port 32.

In FIG. 1 the bypass valve 36 is shown installed for inside to outside flow through the device 10. However, the bypass valve 36 may be reversed for outside to inside flow from the port 32 to the port 30. Thus, simply by reversing the bypass valve 36, the filtering device 10 of the present invention may be utilized for flow in either direction.

Referring now to FIGS. 4–5 an alternative bypass means is thereshown which also routes fluid directly from the inlet port 30 to the outlet port 32, but is embodied in the concave plate 144 and the filter element 142 rather than in the filter head 14.

The alternative bypass means comprises the tublar fluid housing 112, the rotatably securable filter head 114, and a modified removably insertable filter component 116. As with the first preferred embodiment, the filter head 114 is provided with fluid passageways 126 and 128 which fluidly communicate with the ports 130 and 132, respectively, and the housing 112. However, no passage directly connects the passageways 126 and 128 in the filter head 114 in this embodiment.

As is best shown in FIG. 5, the filter component 116 includes a plate 144, and a tubular filter element 142, comprising an end cap 145 secured to the bottom of the filtering material 147 and an annular cap 143 secured to the top of the filtering material 147. Thus, as with the first embodiment, the filter element 142 defines an inner chamber 150 and an outer chamber 152. However, unlike the first embodiment, the plate 144 is slidably secured to the filter element 142. The plate 144 includes a downwardly depending flange portion 100 which closely contacts the filter element 142. The flange 100 defines an annular opening 156 which has a diameter slightly larger than the diameter of the tubular filter element 142 but less than the diameter of the filter caps 143, 145 so that the filter element 142 is entrained within annular opening 156. In addition, the flange portion 100 includes a shoulder 102 which abuts against the annular cap 143 of the filter element 142 when the filter component 116 is lifted from the housing 112 or when the bypass mechanism is in operation as described in more detail herein.

Referring now to FIG. 4, a resilient coil spring 164 is provided between the bottom wall 120 of the housing 112 and the end cap 145 of the filter element 142. The spring 164 urges the filter element 142 towards the filter head 114 to abut the annular cap 143 of the filter element 142 against the seal 134. The spring 164, along with the filter component 116 acts as the bypass means for this embodiment. As the filtering material 147 becomes clogged and pressure within the inner chamber 150 increases, the filter element 142 will be urged axially downwardly against the spring 164. Since the filter element 142 is slidably disposed within the opening 156 of the plate 144, the element 142 is urged towards the bottom of the housing 112, while the plate 144 and seal 160 will remain stationary. With increased pressure and axial descension of filter element 142, the annular cap 143 of the filter element 142 will separate from the seal 134 thereby allowing fluid to bypass the filter material 147 and providing direct fluid communication between the passageways 126 and 128.

Operation of the embodiment shown in FIGS. 4 and 5 permits fluid flow in only one direction, inside-to-outside. Thus, port 130 must necessarily be the inlet port and fluid flows through the passageway 126 into the inner chamber 150. After passing through the filter element 142, fluid flows into the outer chamber 152 and then into passageway 128 and out the outlet port 132.

Yet another embodiment of a bypass means is shown in FIG. 6. In this particular embodiment, the fluid is routed to a tank or a secondary filter rather than directly to the outlet port 232. The bypass means is activated if filter element 242 is absent from housing 212 or if the pressure in inner chamber 250 drops significantly. In this embodiment the flow must be from port 230 to passage 226 to outer chamber 252 through filtering material 247 to inner chamber 250, to passageway 228 and finally out port 232. This is the reverse of the flow required of the embodiment of FIG. 4–5.

The bypass means of this embodiment comprises a tubular housing 212, a modified rotatably securable filter head 214, and modified filter component 216. The filter head 214 contains typical passageways 226 and 228 and ports 230 and 232. However, an intermediate passageway 237 connects the inlet passageway 226 to a bypass port 233 disposed above and extending at substantially right angles to inlet port 230.

Filter component 216 comprises a filter element 242 and a concave plate 244. Concave plate 244 is attached to filter cap 243 which is a disk type with numerous perforations 257 (see FIG. 7) rather than the annular type shown in FIG. 2. A spindle 290 having an annular base 292 rests on the central portion of disk type filter cap 243. The spindle 290 extends axially upward through passageway 228 and into a bore 294 in filter head 214. A valve body 296 slides on spindle 290 between a first position in which it seats in bore 294, thus closing intermediate passageway 237 while simultaneously opening passageway 228, and a second position in which valve body 296 seats in passageway 228, thus closing it off while simultaneously opening intermediate passage 237 to bypass port 233.

Seals, such as "O" rings or the like, may be disposed on valve body 296 or in filter head 214. First seal 297 seals the bore 294 between intermediate passage 237 and bypass port 233 when valve body 296 is in the first position. When the valve body 296 is in the second position, second seal 298 seals the passageway 228. Third seal 299 seals the bore 294 between the intermediate passageway 237 and the passageway 228 when the valve body 296 is in either position to prevent leakage of unfiltered fluid.

A first compression spring 241 is disposed between the annular base 292 of the spindle 290 and the valve body 296 and tends to seat the valve in the bore 294. A second compression spring 240 is disposed between the top of the filter head 214 and the valve body 296 and tends to seat the valve in the passageway 228. The springs 240, 241 are selected so that second spring 240 is slightly stronger than first spring 241, but so that the force of first spring 241 plus the force of fluid pressure in passageway 228 overcomes the stronger second spring 241 and keeps the valve body 296 seated in the bore 294 during normal operation.

However, if the filtering material 247 becomes dirty and clogged causing an increase in the pressure differential between the inlet passageway 226 and the outlet passageway 228, the spring forces become unbalanced and the valve body 296 seats in passageway 228 under the force of stronger second compression spring 240. Thus, if the filtering material 147 becomes clogged the device 10 automatically responds to the pressure change and opens the intermediate passageway 237 to bypass port 233. Similarly, if the filter element 242 is absent or if a wrong filter having an annular cap 43 is installed, the second compressed spring 240 will force the complete valve assembly down into passageway 228. Thus, if a proper filter element 242 is not present the bypass port 233 is again opened automatically.

The present invention provides a fluid filtering device of variable complexity which avoids the damage potentially caused to a system by operating it without a filter element or with a clogged filter element. Absence of a filter element is readily apparaent from a leak, an indicator lamp or by operation of a bypass port. Damage potentially caused by a clogged filter is alleviated by routing fluid around the element and directly to the outlet port or by routing fluid through a bypass port to a tank or secondary filter.

The foregoing detailed description has been given for clearness of understanding only and no unnecessary limitations should be understood therefrom as some modifications will be obvious to those skilled in the art from the scope of the appended claims.

I claim:
1. A fluid filtering device comprising:
a housing defining an interior fluid chamber;
a filter head securable to said housing, said filter head having an inlet port and an outlet port and fluid passageways connecting said ports and said fluid chamber;
filter means removably insertable into said housing chamber, said filter means comprising a filter element and sealing means secured to said filter element, wherein said sealing means is disposed between said housing and said filter head when said filter head is secured to said housing and wherein removal of said filter means causes removal of said sealing means; and
means for indicating the absence of filter means in said housing, said indicating means comprising means for enabling the leakage of fluid between said filter head and said housing.

2. The filtering device as defined in claim 1 wherein said filter means includes a concave plate having a lower portion adjacent said filter element and having said sealing means disposed on the outer rim of said plate.

3. The filtering device as defined in claim 2 wherein said filter element includes a filter material enclosed between a bottom filter cap and a top filter cap and defining an inner fluid chamber and an outer fluid chamber of said housing.

4. The filtering device as defined in claim 3 wherein said concave plate is connected to said top filter cap, said plate having a central opening and said top filter cap having at least one opening which provides fluid communication between said inner fluid chamber and one of said fluid passageways of said filter head, and said plate further having a plurality of peripherally disposed apertures which provide fluid communication between said outer fluid chamber and the other of said fluid passageways of said filter head.

5. The filtering device as defined in claim 3 wherein said filter element is slidably entrained by said lower portion of said concave plate and is movable relative to said concave plate.

6. The filtering device as defined in claim 5 and further comprising means for bypassing said filter means and providing direct fluid communication between said fluid passageways of said filter head wherein said bypass means is responsive to an excessive fluid pressure differential across said filter element.

7. The filtering device as defined in claim 6 wherein said bypass means comprises:
said movable filter element; and
a compressible coil spring disposed between the bottom of said housing and said filter element,
wherein said filter element is movable against said compressible coil in response to excessive fluid pressure within said inner fluid chamber, thereby providing direct fluid communication between said fluid passageways of said fluid head.

8. The filtering device as defined in claim 3 and further comprising a bypass port fluidly connectable to said inlet port through an intermediate passageway,
a valve assembly,
wherein said valve assembly fluidly connects said inlet port selectively to said bypass port or to said filter means.

9. The filtering device as defined in claim 8 wherein said valve assembly includes means for automatically directing fluid to said bypass port in response to the absence of a filter element in said housing and in response to an excessive fluid pressure differential across said filter element.

10. The filtering device as defined in claim 9 wherein said valve assembly comprises:
a spindle disposed in a fluid passageway within the fluid heat and having an annular base portion abutting said top filter cap;

a valve body slidably disposed on said spindle and movable between a first position in which it seals off said bypass port, and a second position in which it seals off said fluid passageway leading to said outlet port;

a first compression spring disposed between said annular base of said spindle and the bottom of said valve body and coaxial with said spindle;

a second compression spring disposed between the top of said filter head and the top of said valve body and coaxial with said spindle;

wherein said first compression spring tends to seat said valve body in said first position against the force of said second compression spring which tends to seat said valve body in said second position.

11. The filtering device as defined in claim 10 wherein said valve body contains seals to resist fluid flow between said intermediate passageway and said bypass port when said valve body is in said first position between said fluid passageway and said outlet port when said valve body is in said second position and between said intermediate passageway and said outlet port when valve body is in either position.

12. The filtering device as defined in claim 10 wherein said means for automatically directing fluid to said bypass port in response to an excessive fluid pressure differential across said filter element comprises said second compression spring whereby the compression force of said second compression spring is less than the opposing force exerted by the sum of said first compression spring plus normal fluid pressure, but greater than the opposing force exerted by said first compression spring alone or with diminished fluid pressure.

13. The filtering device as defined in claim 10 wherein said means for automatically directing fluid to said bypass port in response to the absence of a filter element in said housing comprises said second compression spring whereby the compression force of said second compression spring is unopposed if said top filter cap of said filter element is not present in said housing for said base of said spindle to abut against.

14. The filtering device as defined in claim 2 wherein said outer rim of said concave plate is integrally formed with said sealing means.

15. The filtering device as defined in claim 14 wherein said seal and said outer rim of said concave plate are disposed between said filter head and said fluid housing thereby securing said filtering means within said housing.

16. The filtering device as defined in claim 1 and further comprising means for bypassing said filter means and providing direct fluid communication between said fluid passageways of said filter head wherein said bypass means is responsive to an excessive fluid pressure differential across said filter element.

17. The filtering device as defined in claim 16 wherein said bypass means comprises a bypass valve extending between said fluid passageways in said filter head.

18. The filtering device as defined in claim 1 wherein said filter head is rotatably secured to said fluid housing.

19. A fluid filtering device comprising:

a housing defining an interior fluid chamber;

a filter head securable to said housing, said filter head having an inlet port and an outlet port and fluid passageways connecting said ports and said fluid chamber;

filter means removable insertable into said housing chamber, said filter means comprising a filter element and sealing means secured to said filter element, said filter element being electrically conductive; and means for indicating the absence of filter means in said housing, said indicating means comprising an indicator electrically connected to a voltage source and a switch means in an electrical circuit wherein the filter element, when in place inserted in said housing, forms a part of said electrical circuit.

20. The filtering device as defined in claim 19 wherein said switch means comprises a spring which, when a filter element is in place in said housing, contacts said filter element to complete the electrical circuit and activate said indicator.

21. The filtering device as defined in claim 19 wherein said switch means comprises contacts which are open when said filter element is in place in said housing and are closed, completing said electrical circuit, when said filter element is absent from said housing.

* * * * *